United States Patent [19]
Meyer

[11] 3,780,259
[45] Dec. 18, 1973

[54] NONCONSUMABLE TUNGSTEN ELECTRODE FOR ARC WELDING

[75] Inventor: Robert J. Meyer, Willoughby Hills, Ohio

[73] Assignee: TRW Inc., Cleveland, Ohio

[22] Filed: Oct. 6, 1971

[21] Appl. No.: 187,063

[52] U.S. Cl.................. 219/145, 219/75, 219/119, 313/352, 313/357
[51] Int. Cl............................................. B23k 35/00
[58] Field of Search.................... 219/75, 119, 145, 219/69 E; 313/63, 209, 352, 357

[56] References Cited
UNITED STATES PATENTS

| | | | |
|---|---|---|---|
| 3,076,085 | 1/1963 | Sundstrom | 219/75 |
| 3,471,675 | 10/1969 | Sargent et al. | 219/75 |
| 1,949,276 | 2/1934 | Huffman | 313/209 X |
| 1,993,811 | 3/1935 | Soundy | 313/209 X |
| 2,744,945 | 5/1956 | Johnson | 13/18 |
| 2,379,187 | 6/1945 | Richards | 219/119 |

Primary Examiner—R. F. Staubly
Assistant Examiner—George A. Montanye
Attorney—Carlton Hill et al.

[57] ABSTRACT

A nonconsumable tungsten or tungsten alloy electrode for arc welding having a cylindrical body ending in a planar end surface characterized by a cavity on the center line of the end surface to produce an annular flat surface at the electrode tip. The cavity is preferably a cylindrical cavity having a diameter in the range of 25 to 50 per cent of the diameter of the electrode and the cavity may terminate in a flat bottom or a conical portion. The tip configuration formed by the cavity improves the dimensional stability of the tip so that the arc formed during welding is concentrated and stabilized at the centerline of the electrode.

2 Claims, 4 Drawing Figures

PATENTED DEC 18 1973 3,780,259

INVENTOR.
Robert J. Meyer

BY Hill, Sherman, Meroni, Gross & Simpson
ATTORNEYS

NONCONSUMABLE TUNGSTEN ELECTRODE FOR ARC WELDING

BACKGROUND OF THE INVENTION

1. Field of the Invention

The present invention is directed to an electrode for arc welding and specifically to a nonconsumable tungsten electrode.

2. Prior Art

In tungsten arc welding processes, tungsten electrodes are used to conduct an electrical current to a position near the surface of the metal to be welded and are usually provided with either a conical tip or a rounded or bulbous tip. The discharge or the passage of the current from the tip to the workpiece tends to be diverging and during welding processes heats the tip. During repeated welding steps, the heated tip becomes deformed so that the discharge from the tip tends to be erratic as to intensity and direction and thus with precisioned welding particularly in a welding machine, the electrodes must be replaced and the tips repointed. On an average the present electrodes with a conical tip can perform between 8 and 25 welds having a narrow, accurately controlled bead of variably controlled penetration with a short length of about one inch before being replaced with the average less than 15 welds between replacement. Such a short number of welds raises the cost of tungsten arc welding due to the cost of continually replacing tips that have become deformed.

In the use of consumable electrodes, various different configurations have been suggested primarily for the purpose of insuring the proper amount of flux to be present with the filler rod. For example it has been suggested that the flux coating extend past the tip or to have a larger thickness at the tip of the weld rod to insure ample flux at the begining or striking of the arc. It has also been suggested to prevent sticking of the consumable electrode to provide a conical cavity to concentrate all of the current during initial striking of the arc at a peripheral edge which will easily vaporize or melt away due to the intensity of the current passing through to prevent sticking.

SUMMARY OF THE INVENTION

The present invention is directed to a nonconsumable electrode such as a tungsten electrode or tunsten alloy electrode utilized in a tungsten arc welding process having a tip formed of a flat surface extending substantially transverse to the centerline of the electrode with means for providing dimensional stability of the tip and for concentrating and stabilizing the arc formed during welding at the centerline of the electrode. The means is a cavity at the centerline of the electrode opening on the flat surface to provide an annular flat surface for the tip. Preferably the cavity has a cylindrical portion which terminate in either a flat bottom or in a conical portion. The stabilization of the dimension of electrode tip enables a large number of welds per electrode used in an automatic welding device with high precision before the electrode must be replaced for repointing or machining of the tip.

Accordingly it is an object of the present invention to provide a nonconsumable electrode having a tip configuration which has greater dimensional stability and concentrates and stabilizes the arc at the center-line of an electrode.

Another object of the present invention is to provide an electrode having a tip configuration which enables a greater amount of welding without replacement.

A still further object of the present invention is to provide a nonconsumable electrode having a tip configuration which reduces the cost in operating a welding apparatus.

Other objects, features and advantages of the present invention will be readily apparent from the following description of the preferred embodiments thereof taken in conjunction with the accompanying drawings although variations and modifications may be effected without departing from the spirit and scope of the novel concept of the disclosure.

DESCRIPTION OF THE PREFERRED EMBODIMENTS

Figure 1:
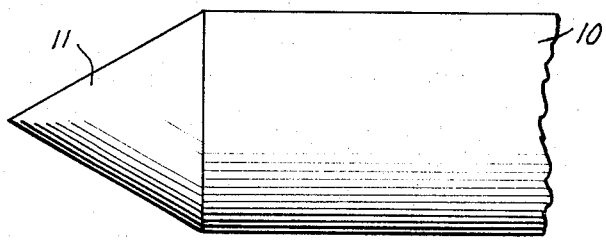
FIG. 1 is a partial side view of a nonconsumable tungsten electrode of the prior art.
Figure 3:
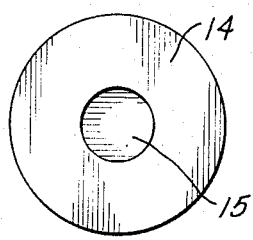
FIG. 3 is an end view of the electrode of the present invention.

A prior art nonconsumable electrode 10 is illustrated in FIG. 1 and was preferably made of tungsten or tungsten alloy. The electrode 10 has a cylindrical body terminating at a tip 11 which is a conical or pointed tip. When used in a welding machine, the heat of the current flowing from the tip 11 into a workpiece would heat the tip which would become deformed from the centerline of the electrode causing an erratic arc. Such a defect would destroy the precision welding desired when the electrode is used in a welding machine. Prior art electrodes such as 10 could be used for approximately 8 to 25 welds with the average usage being usually less than 15 welds before the deforming of the tip 11 requires the replacement of the electrode 10.

Figure 2:
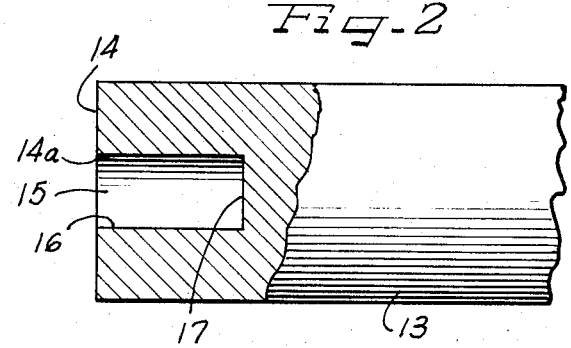
FIG. 2 is a partial side view with a portion in cross section of the nonconsumable electrode tip of the present invention.

The principles of the present invention are useful in a nonconsumable electrode 13 illustrated in FIG. 2. The electrode 13 is preferably a tungsten electrode or a tungsten alloy electrode and has a cylindrical body terminating in a tip face or surface 14 which is substantially planar and extends at substantially 90° to the centerline of the electrode 13. The tip surface 14 has means for providing dimensional stability and for concentrating and stabilizing the arc formed during welding at the centerline of the electrode 13 which means is a cavity 15 extending into the body from the surface 14 and as illustrated has a cylindrical surface 16 terminating with a flat bottom 17 to provide a cylindrical portion. As illustrated, the cavity 15 is on the centerline of electrode 13 with the surface 16 being concentric to the centerline. The surface 16 intersects the surface 14 at a peripheral edge 14a and provides an annular surface for the tip of the electrode. With the cavity 15, the dimensional stability of the electrode is greatly increased and results in a concentrating and stabilizing of the arc occurring during welding.

Figure 4:
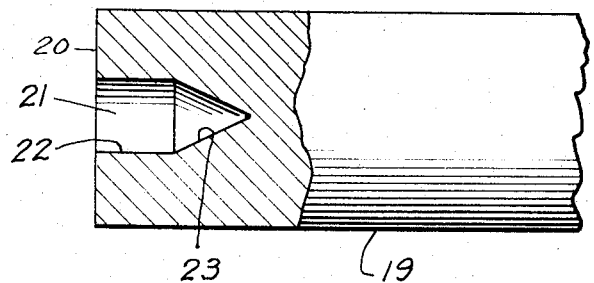
FIG. 4 is a side view with a portion in cross section illustrating an embodiment of the tip configuration of the present invention.

In the embodiment illustrated in FIG. 4, an electrode 19 has a tip surface or face 20 with a centerline cavity 21. The cavity 21 has a cylindrical portion 22 which terminates in a conical portion 23. As in the previous embodiment, the cavity 21 provides a similar annular surface for end surface 20 of the electrode 19.

The cavities 15 or 21 of electrodes 13 and 19 are preferably formed by electrical discharged machining (EDM) with the diameter of the cylindrical portion of the cavity being between 25 and 50 percent of the diameter of the electrodes. The depth of the cavity 15 or 21 is at least 25 percent of the diameter of the electrode and less than twice the diameter of the electrode. For the cavity 21 of the electrode 19, the depth of the cylindrical portion 22 is at least 25 percent of the diameter of the electrode and the overall depth of the cavity 21 is less than twice the diameter of the electrode. The conical portion 23 is formed with an apex angle of between 45° and 120°. For example electrodes having a diameter of 0.120 inches were prepared with some electrodes having a cavity diameter of 0.03, 0.04 and 0.06 inches.

Tests were conducted with various embodiments of the electrodes by striking an arc and welding. Results from these tests show electrodes of the present invention producing good weld for between 63 and 280 starts and welds as compared to between 8 to 25 starts and welds for the prior art electrode with the pointed or conical tip. Thus the electrodes of the present invention have a greater number of starts and welds before requiring replacement than the prior art pointed electrode.

As mentioned before, the line of current flow during formation of the arc from a prior art pointed electrode to the workpiece are believed to be from the conical portion adjacent the tip and to be slightly diverging. The improved concentration and stabilization of the arc with the electrodes of the present invention is believed to be because the line of current flow during formation of the arc is from a portion of the end surface and a portion of the cylindrical surface which portions are adjacent the peripheral edge 14a. Thus it is believed that the line of flow of the current for the electrode of the present invention are slightly converging instead of the slightly diverging flow lines of the prior art pointed electrode and produce a more concentrated and stabilized arc.

Although minor modifications might be suggested by those versed in the art it should be understood that I wish to employ within the scope of the patent warranted hereon all such modifications as reasonably and properly come within the scope of my contribution to the art.

I claim:

1. A nonconsumable electrode limited for use in an arc welding system having an electrode supplied with power to form a welding arc, said electrode consisting of tungsten and tungsten alloy and having a cylindrical body portion terminating in a tip, the improvement comprising the tip having a planar surface extending transverse to the centerline of the electrode and having means for improving the dimensional stability of the tip of the electrode and for concentrating and stabilizing the arc formed during welding at the centerline of the electrode, said means comprising a cavity on the centerline of the electrode extending into the body portion to a limited depth to provide an annular end surface for the tip, said cavity having a cylindrical cavity portion adjacent the planar surface which portion is concentric with the centerline of the electrode and terminates in a flat bottom wall, said cylindrical portion having a diameter in the range between 25 and 50 percent of the diameter of the electrode and the depth of the cavity being at least 25 percent of the diameter of the electrode and less than twice the diameter of the electrode.

2. A nonconsumable electrode limited for use in an arc welding system having an electrode supplied with power to form a welding arc, said electrode consisting of tungsten and tungsten alloy and having a cylindrical body portion terminating in a tip, the improvement comprising the tip having a planar surface extending transverse to the centerline of the electrode and having means for improving the dimensional stability of the tip of the electrode and for concentrating and stabilizing the arc formed during welding at the centerline of the electrode, said means comprising a cavity on the centerline of the electrode extending into the body portion to a limited depth to provide an annular end surface for the tip, said cavity having a cylindrical cavity portion adjacent to the planar surface which portion is concentric with the centerline of the electrode and terminates in a conical cavity portion having an apex angle in a range of between 45° and 120°, said cylindrical portion having a diameter in the range between 25 and 50 percent of the diameter of the electrode and the depth of the cylindrical portion of the cavity being at least 25 percent of the diameter of the electrode and the overall depth of the cavity being less than twice the diameter of the electrode.

* * * * *